US011911869B2

(12) United States Patent
Oh et al.

(10) Patent No.: US 11,911,869 B2
(45) Date of Patent: Feb. 27, 2024

(54) CHEMICAL MECHANICAL POLISHING SYSTEM WITH PLATEN TEMPERATURE CONTROL

(71) Applicant: Applied Materials, Inc., Santa Clara, CA (US)

(72) Inventors: Jeonghoon Oh, Saratoga, CA (US); Jamie Stuart Leighton, Palo Alto, CA (US); Van H. Nguyen, Milpitas, CA (US); Roger M. Johnson, Livermore, CA (US)

(73) Assignee: Applied Materials, Inc., Santa Clara, CA (US)

( * ) Notice: Subject to any disclaimer, the term of this patent is extended or adjusted under 35 U.S.C. 154(b) by 898 days.

(21) Appl. No.: 16/752,181

(22) Filed: Jan. 24, 2020

(65) Prior Publication Data

US 2020/0246935 A1 Aug. 6, 2020

Related U.S. Application Data

(60) Provisional application No. 62/800,839, filed on Feb. 4, 2019.

(51) Int. Cl.

| | |
|---|---|
| ***B24B 37/015*** | (2012.01) |
| ***B24B 49/14*** | (2006.01) |
| ***G05B 11/42*** | (2006.01) |
| ***B24B 49/08*** | (2006.01) |
| *B24B 37/34* | (2012.01) |
| *B24B 55/02* | (2006.01) |

(52) U.S. Cl.

CPC ............ *B24B 37/015* (2013.01); *B24B 49/08* (2013.01); *B24B 49/14* (2013.01); *G05B 11/42* (2013.01); *B24B 37/34* (2013.01); *B24B 55/02* (2013.01)

(58) Field of Classification Search

CPC ....... B24B 37/015; B24B 49/08; B24B 49/14; G05B 11/42

USPC .......................... 451/7, 41, 53, 36, 443, 444

See application file for complete search history.

(56) References Cited

U.S. PATENT DOCUMENTS

| | | | | |
|---|---|---|---|---|
| 5,664,990 A * | 9/1997 | Adams | B24B 55/03 | 451/36 |
| 8,292,691 B2 | 10/2012 | Xu et al. | | |
| 8,439,723 B2 * | 5/2013 | Marks | B24B 37/015 | 451/7 |
| 2004/0115949 A1 * | 6/2004 | Chen | H01L 21/67109 | 438/745 |
| 2014/0004626 A1 * | 1/2014 | Xu | B24B 37/015 | 257/E21.528 |

(Continued)

FOREIGN PATENT DOCUMENTS

TW 458849 B 10/2001

*Primary Examiner* — Joel D Crandall
*Assistant Examiner* — Shantese L McDonald
(74) *Attorney, Agent, or Firm* — Patterson + Sheridan, LLP

(57) ABSTRACT

Embodiments of a system and method for polishing substrates are provided. In one embodiment, a polishing system is provided that includes a polishing module having a platen, and a platen temperature control system. The platen temperature control system includes a PID controller, a fluid controller, and a heat exchanger. The flow controller is configured to control an amount of fluid provided from the heat exchanger to a channels of the platen in response to instructions provided by the PID controller.

12 Claims, 3 Drawing Sheets

(56) References Cited

U.S. PATENT DOCUMENTS

2017/0239778 A1* 8/2017 Maruyama .............. B24B 37/20
2019/0143476 A1* 5/2019 Wu ....................... B24B 37/015
451/7

* cited by examiner

CHEMICAL MECHANICAL POLISHING SYSTEM WITH PLATEN TEMPERATURE CONTROL

CROSS-REFERENCE TO RELATED APPLICATIONS

This application claims benefit of U.S. Provisional Application Ser. No. 62/800,839, filed Feb. 4, 2019, of which is incorporated by reference in its entirety.

BACKGROUND

Field

Embodiments of the present invention generally relate to a chemical mechanical polishing system suitable for use in semiconductor manufacturing.

Description of the Related Art

In semiconductor substrate manufacturing, the use of chemical mechanical polishing, or CMP, has gained favor due to the widespread use of damascene interconnects structures during integrated circuit (IC) manufacturing. Although many commercially available CMP systems have demonstrated robust polishing performance, the move to smaller line widths requiring more precise fabrication techniques has presented increasingly difficult challenges.

For example, certain new CMP processes have a very narrow platen temperature operational window. Temperatures below the operational window yield low unacceptably low removal rates, while temperatures above the operational window often break down the polishing fluid, which consequently yields unacceptable polishing results.

Therefore, there is a need for a chemical mechanical polishing system with improved platen temperature control.

SUMMARY

Examples of the disclosed technology include a system and method for polishing substrates. In one example, a polishing system is provided that includes a polishing module having a platen, and a platen temperature control system. The platen temperature control system includes a PID controller, a fluid controller, and a heat exchanger. The flow controller is configured to control an amount of fluid provided from the heat exchanger to a channels of the platen in response to instructions provided by the PID controller.

In another example, a method for chemical mechanical polishing of a substrate is provided. The method includes placing a substrate in contact with a polishing surface of a polishing pad supported on a rotating platen; providing polishing fluid between the substrate and the polishing surface; sensing a temperature of the polishing surface and providing sensed temperature information of the polishing surface to a PID controller; determining, by operation of the PID controller, if the temperature of the polishing surface is within a predefined temperature range; and providing instructions from the PID controller to the flow controller to control an amount of coolant flow provided to channels formed in the platen.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings.

Figure 1:
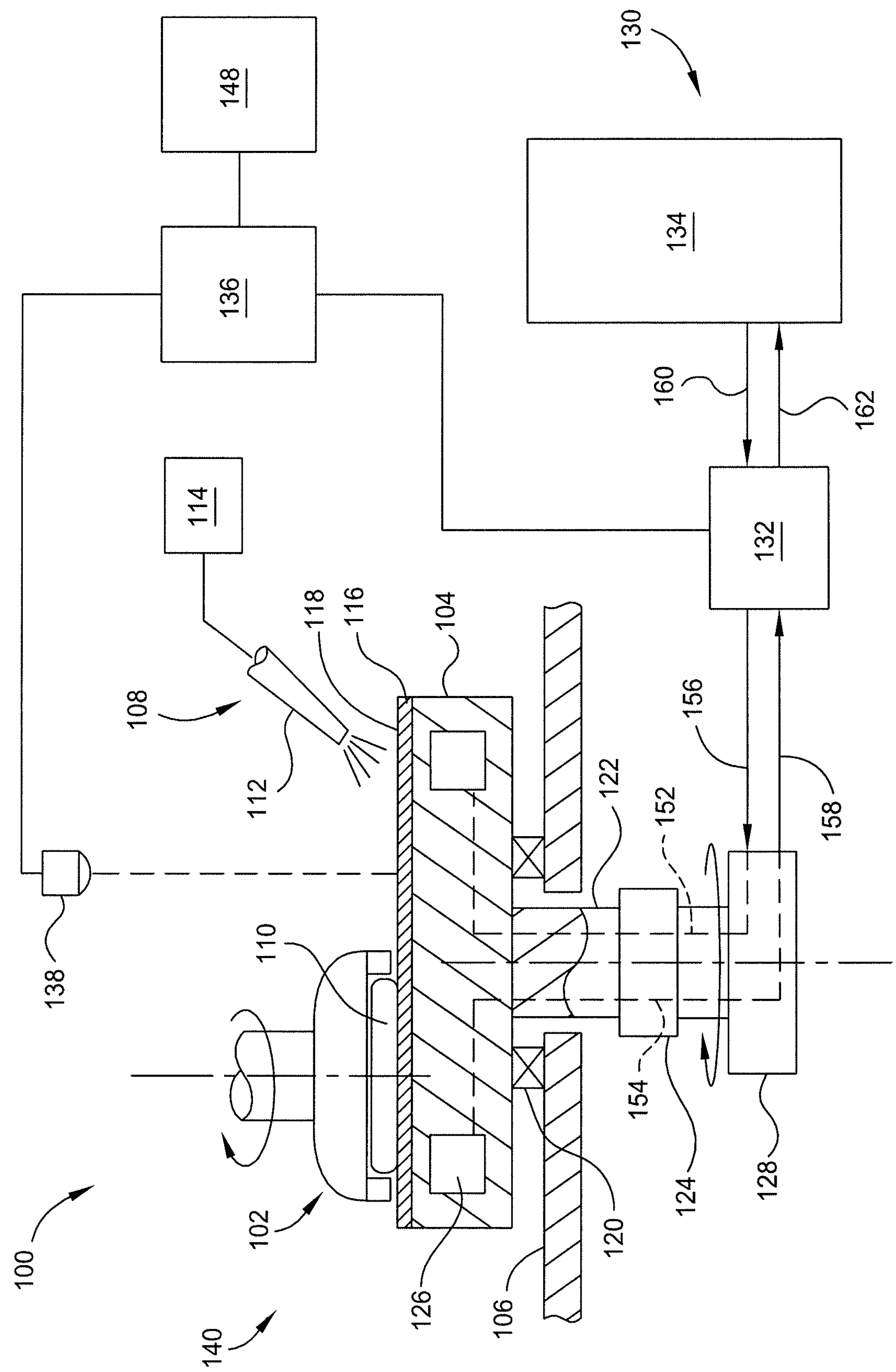
FIG. 1 is a schematic side view of the chemical mechanical polishing system having a platen temperature control system.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

FIG. 1 is a plan view of one embodiment of a chemical mechanical polishing (CMP) system 100. The CMP system 100 generally includes a polishing module 140, a platen temperature control system 130, and a system controller 148. The system controller 148 controls the polishing operation of the polishing module 140.

The polishing module 140 includes a polishing head 102, a platen 104 and a fluid delivery system 108. A substrate 110 is retained in the polishing head 102 and pressed against a polishing surface 118 of a polishing pad 116 that is supported on the platen 104 during polishing. The polishing head 102 may be configured to rotate and/or oscillate the substrate 110 during polishing. The fluid delivery system 108 includes a polishing fluid source 114 that delivers a polishing fluid, such as a slurry containing abrasives, chemicals, or deionized water, to the polishing surface 118 through one or more nozzles 112. The location and amount of polishing fluid provided to the the polishing surface 118 is controlled by the system controller 148.

The platen 104 is supported on a machine base 106. The platen 104 is coupled by a shaft 122 to a rotation mechanism 124, such as a motor, which rotates the platen 104 and pad 116 supported thereon during polishing of the substrate 110. The system controller 148 is provides control signals to the rotation mechanism 124 so as to control the speed and rotation of the platen 104. Bearings 120 may be provided between the platen 104 and the machine base 106 to facilitate rotation of the platen 104.

The platen 104 includes one or more channels 126 through which a coolant is routed to control the temperature of the platen 104, and ultimately, the polishing surface 118 of the polishing pad 116. By controlling the temperature of the polishing surface 118 of the polishing pad 116, the process temperature of substrate polishing may be regulated. In some instances, substrate to pad friction, conditioner to pad friction, and/or chemical reactions of the polishing fluid may heat the polishing surface 118 of the polishing pad 116. Conversely, the polishing surface 118 may cool between polishing operations (i.e., between substrates) and/or during pad rinsing. To prevent the temperature of the polishing surface 118 from drifting outside of a predefined process window, the platen temperature control system 130 controls the flow of a heat transfer fluid, such as a coolant, in the one or more channels 126 of the platen 104 so that the platen temperature, and consequently the temperature of the polishing surface 118 of the polishing pad 116 may be maintained within the predefined process window.

The platen temperature control system 130 includes a flow controller 132, a heat exchanger 134, a proportional integral derivative (PID) controller 136 and a temperature sensor 138. The platen temperature control system 130 is in communication with the system controller 148 to coordinate the temperature control of the platen 104 with the polishing operations performed on the polishing module 140.

The heat exchanger 134 is generally configured to provide a constant flow of coolant to the flow controller 132. The coolant may be a liquid, gas or combination thereof. In one example, the coolant is water. The coolant exiting the heat exchanger 134 to the flow controller 132 may be maintained at a constant temperature and/or volumetric flow rate. In one example, the temperature of the coolant exiting the heat exchanger 134 to the flow controller 132 may be maintained in a range of between about 2.5 to about 15 degrees Celsius, such as about 5 to about 10 degrees Celsius. In the example depicted in FIG. 1, the flow and temperature of the coolant exiting the heat exchanger 134 to the flow controller 132 are maintained in a steady-state condition.

The temperature sensor 138 is coupled to the PID controller 136. The temperature sensor 138 is configured to provide the PID controller 136 with a metric indicative of the temperature of the polishing surface 118 of the polishing pad 116, or alternatively, the temperature of the platen 104. The temperature sensor 138 may be any suitable temperature measuring device, including contact and non-contact temperature measuring devices. In the example depicted in FIG. 1, the temperature sensor 138 is an infra-red temperature sensor positioned to view the the polishing surface 118 of the polishing pad 116 while the polishing module 140 is in operation polishing the substrate 110 retained in the polishing head 102.

The PID controller 136 provides an output, such as a control signal, to the flow controller 132 in response to temperature information received from the sensor 138 which is compared to a predefined temperature criteria (i.e., the predefined polishing surface temperature target window) provided to the PID controller 136 from the system controller 148 or provided to the PID controller 136 from from another source. The PID controller 136 continuously calculates an error value based on the measured pad surface temperature and the predefined temperature criteria, and applies a correction based on proportional, integral, and derivative terms in the form of instructions provided to the flow controller 132. The flow controller 132 in response to the instructions provided from the PID controller 136 controls the amount of coolant flowing through the platen 104.

The flow controller 132 couples the heat exchanger 134 to the channels 126 of the platen 104. A heat exchanger supply line 160 is coupled between the flow controller 132 and the heat exchanger 134 to provide heated coolant to the flow controller 132. A heat exchanger return line 162 is coupled between the flow controller 132 and the heat exchanger 134 to allow coolant to return from the flow controller 132 to the heat exchanger 134.

A flow controller supply line 156 is coupled between the flow controller 132 and a rotary union 128. The rotary union 128 couples the flow controller supply line 156 to the channel 126 via a platen supply line 152 routed through the shaft 122 and platen 104. A flow controller return line 158 is coupled between the flow controller 132 and the rotary union 128. The rotary union 128 couples the flow controller return line 158 to the channel 126 via a platen return line 154 routed through the shaft 122 and platen 104.

The flow controller 132 is operable to control the amount for coolant passing through the channels 126. The amount for coolant passing into the flow controller 132 from the heat exchanger 134 remains constant during processing. However, the flow controller 132 is operable to divert between 0 and 100 percent of the coolant from the heat exchanger 134 back to the heat exchanger 134. Stated differently, even though the amount for coolant entering the flow controller 132 from the heat exchanger 134 remains constant, the flow controller 132 may provide between 0 and 100 percent of the coolant entering the flow controller 132 from the heat exchanger 134 to the channels 126 of the platen 104 in response instructions from the PID controller 136 based on the polishing surface temperature sensed by the sensor 138.

Figure 2:
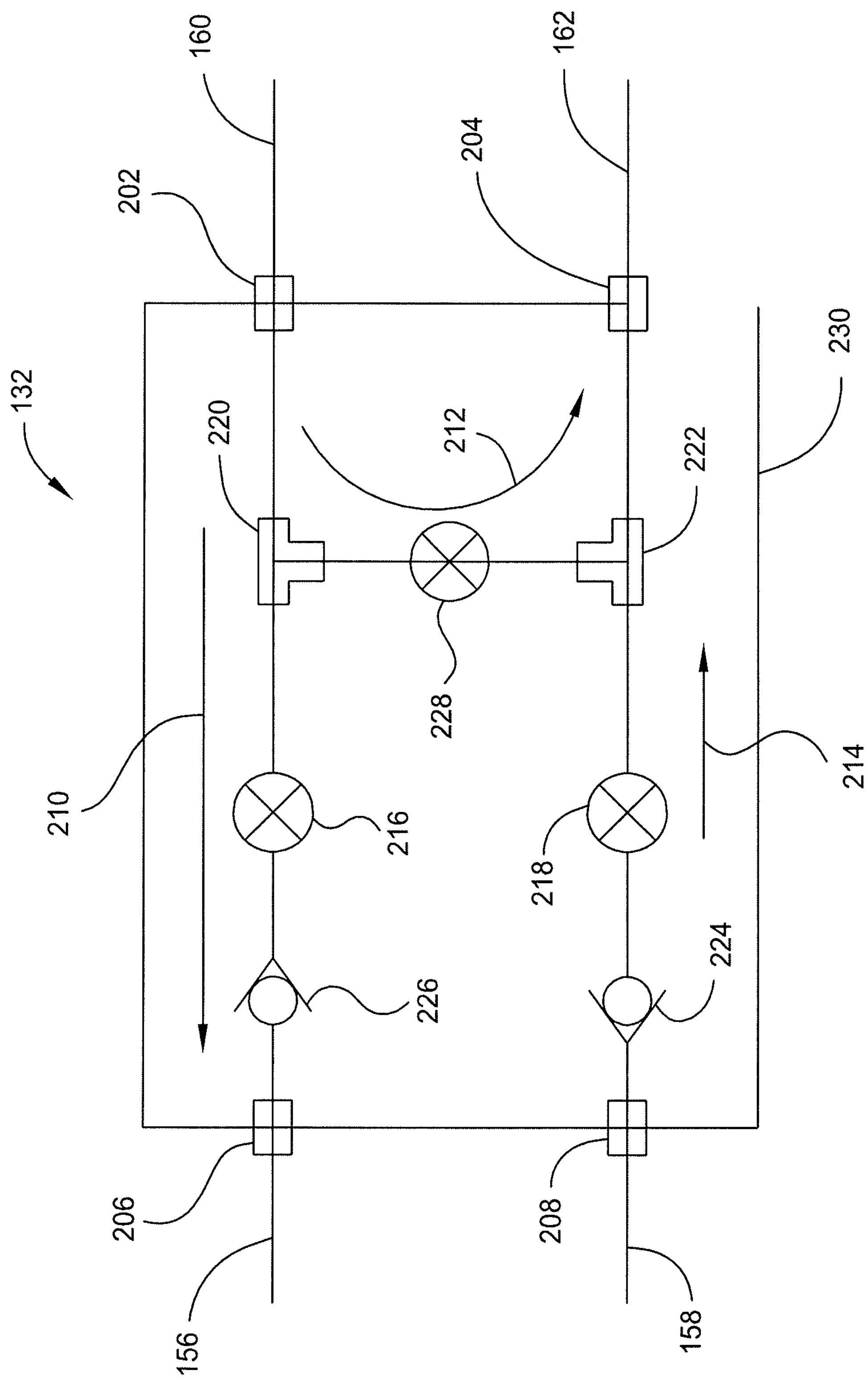
FIG. 2 is a schematic diagram of a flow controller of platen temperature control system of FIG. 1.

FIG. 2 depicts a schematic block diagram of the flow controller 132. The flow controller 132 generally includes a by-pass control valve 228, a supply control valve 216, and optionally, a return control valve 218. The valves 228, 216, 218 are electronically controlled (via instructions from the PID controller 136) so that the amount of flow through each of the valves 228, 216, 218 may be independently controlled.

The valves 228, 216, 218 may be arranged within a housing 230. The valves 228, 216, 218 form a fluid control circuit having a supply inlet port 202, a return outlet port 204, a supply outlet port 206 and a return inlet port 208. The ports 202, 204, 206, 208 may be configured as penetrations through the housing 230.

The supply inlet port 202 is coupled to the heat exchanger supply line 160 and a tee 220 disposed within the housing 230. The tee 220 is also coupled to the by-pass control valve 228 and the supply control valve 216. The supply control valve 216 is coupled to the supply outlet port 206. The supply outlet port 206 is coupled to the flow controller supply line 156 that supplies coolant to the platen 104. Optionally, a check valve 226 may be disposed between the tee 220 and supply outlet port 206 to ensure coolant passing through the supply outlet port 206 only flows in the direction indicated by arrow 210.

The return outlet port 204 is coupled to the heat exchanger return line 162 and a tee 222 disposed within the housing 230. The tee 222 is also coupled to the by-pass control valve 228 and the return control valve 218. The return control valve 218 (or tee 222 when the return control valve 218 is not utilized) is coupled to the return inlet port 208. The return inlet port 208 is coupled to the flow controller return line 158 that returns coolant from the platen 104 to the heat exchanger 134. Optionally, a check valve 224 may be disposed between the tee 222 and the return inlet port 208 to ensure coolant passing through the return inlet port 208 only flows in the direction indicated by arrow 214.

The by-pass control valve 228 generally controls the flow, as shown by arrow 212, of coolant between the supply inlet port 202 and the return outlet port 204. When the by-pass control valve 228 is in a closed (e.g., no flow) state, 100 percent of the coolant entering the flow controller 132 is directed to the platen 104, thus, cooling the polishing surface 118. When the by-pass control valve 228 is in a fully open (e.g., full flow) state, 100 percent of the coolant entering the flow controller 132 is directed back to the heat exchanger 134 without passing through the platen 104, so that the temperature of the polishing surface 118 is permitted to rise due to the heat generated by the polishing process. By either toggling the by-pass control valve 228 between fully open and closed states, or incrementally opening the by-pass control valve 228, between 0 and 100 percent of the coolant entering the flow controller 132 may be directed to the platen 104 as directed by the PID controller 136 so that the polishing surface 118 may be maintained at a predefined temperature (or temperature window). By maintaining the polishing surface 118 at the predefined temperature (or temperature window), desired polishing rates may be achieved without undesirably breaking down the polishing fluid which detrimentally affects product yield. In one example, the predefined window is between about 30 to about 40 degrees Celsius.

In the example depicted in FIG. 2, the flow controller 132 does not mix coolant returning from the platen 104 with coolant entering the flow controller 132 from the heat exchanger 134.

Figure 3:
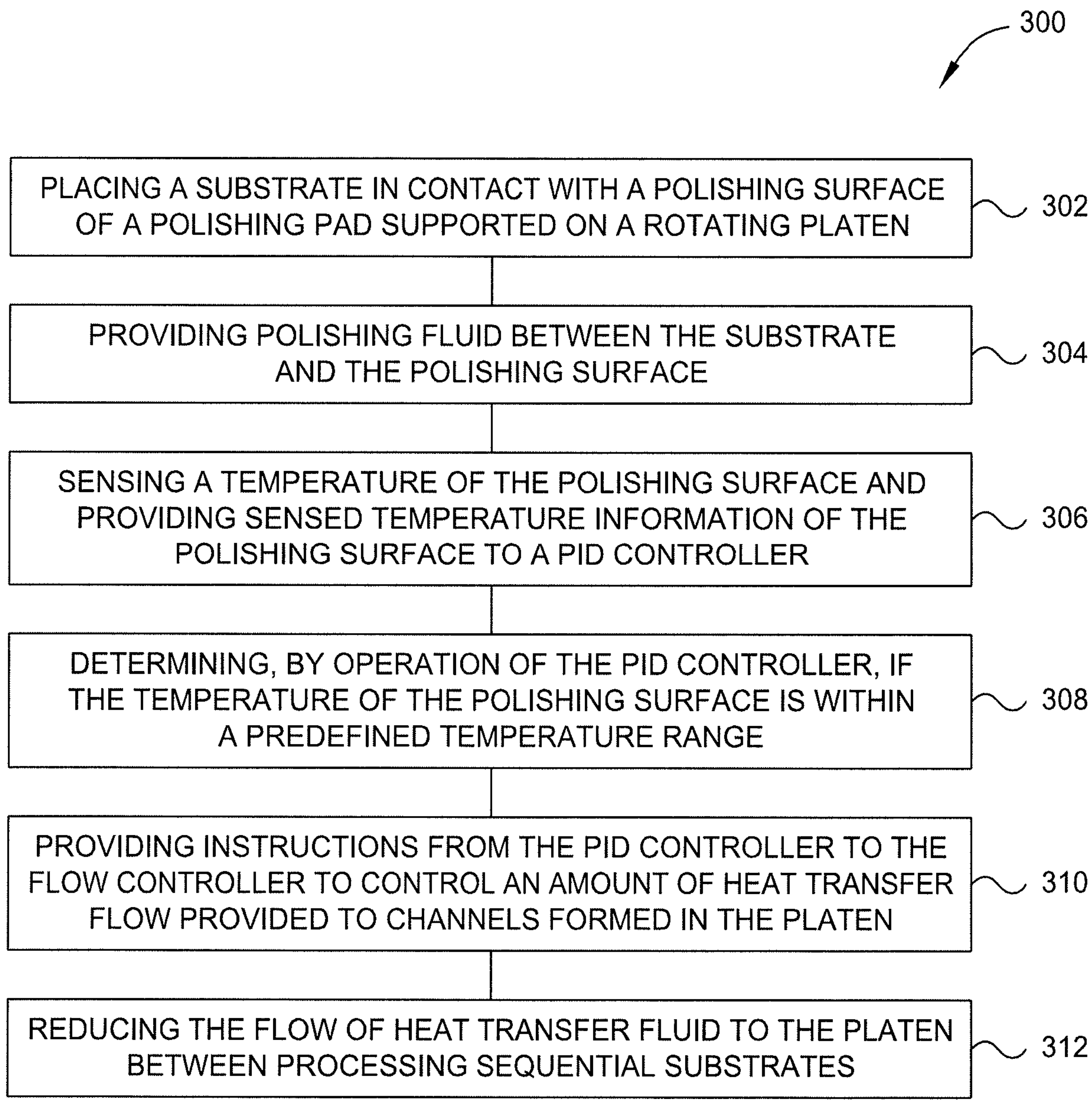
FIG. 3 is a flow diagram of a method for polishing a substrate.

FIG. 3 is a schematic block diagram of a method 300 for chemical mechanically polishing a substrate. The method 300 may be practices on the CMP system 100 described above, or other suitable polishing system.

The method 300 begins at operation 302 by placing a substrate 110 in contact with a polishing surface 118 of a polishing pad 116 supported on a rotating platen 104. At operation 304, polishing fluid is provided between the substrate 110 and the polishing surface 118, for example, by dispensing polishing fluid on the polishing surface 118 of the rotating polishing pad 116.

At operation 306, a temperature of the polishing surface 118 is sensed, for example by a sensor 138. The sensor 138 provides temperature information of the polishing surface 118 to a PID controller 136.

At operation 308, the PID controller 136 determines if the temperature of the polishing surface 118 is within a predefined temperature range. If the PID controller 136 determines if the temperature of the polishing surface 118 outside of the predefined temperature range, or trending in a direction to go outside of the predefined temperature range, the PID controller 136 at operation 310 provides control signal, instructions or information, such as a signal (digital or analog), to the flow controller 132 that controls an amount of coolant flow provided to channels 126 formed in the platen 104 which consequently controls the temperature of the polishing surface 118.

For example at operation 310, the flow controller 132 may provide a high percentage (including as high as 100 percent) of the coolant flow entering the flow controller 132 to the platen 104 in response to the PID controller 136 determining the polishing surface 118 needs to be cooled. In another example, the flow controller 132 may provide a low percentage (including as low as zero percent) of the coolant flow entering the flow controller 132 to the platen 104 in response to the PID controller 136 determining the polishing surface 118 needs to be heated.

Operations 306, 308, 310 are repeated many times during polishing of a single substrate. During these repeated operations, operation 310 may cause more or less flow of coolant to reach the platen 104 at different stages of the polishing operation. Once the substrate 110 is polished, the flow of coolant to the platen 104 at operation 312 may be reduced as low as zero so as to prevent chilling of the platen 104 between processing sequential substrates.

While the foregoing is directed to embodiments of the present invention, other and further embodiments of the invention may be devised without departing from the basic scope thereof, and the scope thereof is determined by the claims that follow.

What is claimed is:

1. A chemical mechanical polishing system comprising:
a polishing module comprising:
a platen having coolant channels; and
a platen temperature control system comprising:
a PID controller;
a flow controller comprising:
a housing having a supply inlet port, a return outlet port, a supply outlet port and a return inlet port; and
two or more valves for controlling coolant flow, wherein the two or more valves include a by-pass control valve configured to control the flow of coolant between the supply inlet port and the return outlet port; and
a heat exchanger; the flow controller configured to control an amount of coolant provided from the heat exchanger to the channels of the platen in response an output of the PID controller.

2. The chemical mechanical polishing system of claim 1 further comprising:
a shaft coupling the platen to a rotation mechanism; and
a rotary union coupling the flow controller to the coolant channel via a platen supply line routed through a shaft and platen.

3. The chemical mechanical polishing system of claim 1 wherein the supply inlet port is coupled to a supply line of the heat exchanger and a tee disposed within the housing.

4. The chemical mechanical polishing system of claim 3 wherein the tee is also coupled to the by-pass control valve and a supply control valve coupled to the supply outlet port.

5. The chemical mechanical polishing system of claim 4 wherein the return outlet port is coupled to a return line of the heat exchanger and the tee disposed within the housing.

6. The chemical mechanical polishing system of claim 1 wherein the by-pass control valve is moveable between an open state and a closed state and wherein the by-pass control valve in a closed state is configured to direct 100 percent of the coolant entering the flow controller to the platen.

7. The chemical mechanical polishing system of claim 1 wherein the flow controller does not mix coolant returning from the platen with coolant entering the flow controller from the heat exchanger.

8. A method for chemical mechanical polishing of a substrate, the method comprising:
(A) placing a substrate in contact with a polishing surface of a polishing pad supported on a rotating platen;
(B) providing polishing fluid between the substrate and the polishing surface;
(C) sensing a temperature of the polishing surface and providing sensed temperature information of the polishing surface to a PID controller;
(D) determining, by operation of the PID controller, if the temperature of the polishing surface is within a predefined temperature range; and
(E) providing an output from the PID controller to a flow controller, the flow controller having a supply inlet port, a return outlet port, a supply outlet port and a return inlet port; and two or more valves which includes a by-pass control valve, the flow controller operable to control the two or more valves, the two or more valves operable to control an amount of coolant flow between the supply inlet port and the return outlet port and provided to channels formed in the platen.

9. The method of claim 8 further comprising:
repeating C, D, E during polishing of the substrate.

10. The method of claim 8 further comprising:
reducing the flow of coolant to the platen between processing sequential substrates.

11. The method of claim 8 wherein the flow controller provides greater than 50 percent of the coolant flow entering the flow controller to the platen in response to the PID controller determining the polishing surface needs to be cooled.

12. The method of claim 8 wherein the flow controller provides less than 50 percent of the coolant flow entering the flow controller to the platen in response to the PID controller determining the polishing surface needs to be heated.

* * * * *